Figure 1:
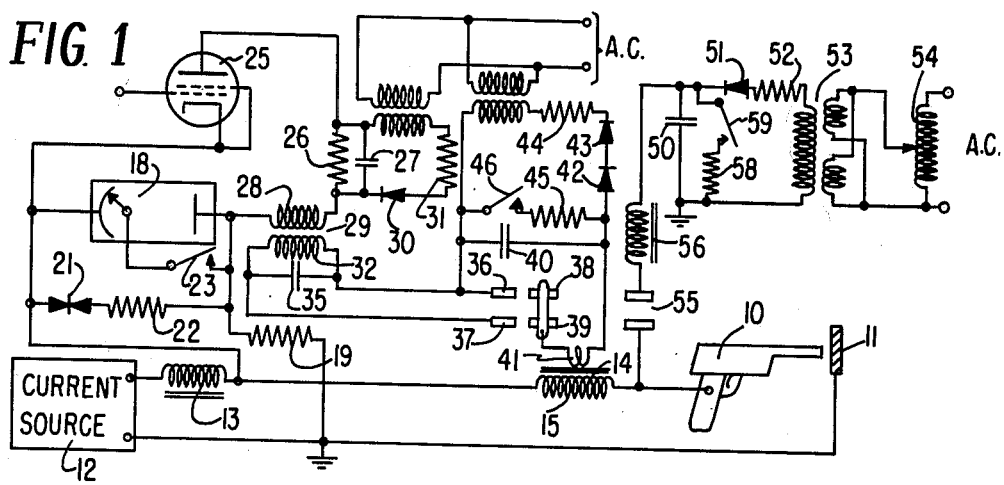

Oct. 27, 1964 — M. R. SOMMERIA — 3,154,721
ARC STARTING SYSTEM
Filed Oct. 1, 1962

INVENTOR.
Marcel R. Sommeria
BY
Mueller & Aichele
Attys.

_United States Patent Office_ 3,154,721
Patented Oct. 27, 1964

3,154,721
ARC STARTING SYSTEM
Marcel R. Sommeria, Palos Heights, Ill., assignor to Welding Research, Inc., Chicago, Ill., a corporation of Illinois
Filed Oct. 1, 1962, Ser. No. 227,481
10 Claims. (Cl. 315—172)

This invention relates generally to welding systems and more particularly to a system for starting an arc between a welding electrode and a work piece at a desired instant.

It is important in many welding applications that the duration of the welding arc be precisely controlled. For example, in spot welding it is desired that the welding time for each spot be fixed. In order to accomplish this it is necessary that both the starting and the stopping of the arc be accurately controlled. There is no problem in accurately stopping the arc, but there is a problem in starting the arc because many factors affect the instant of firing of the arc. For example, slight irregularities in the work piece affect the firing voltage required to initiate the arc. The time of starting of the arc may be established by providing physical contact between the electrode and the work piece but this is undesirable for many reasons. First, it would be necessary to provide a mechanical movement each time the arc is established, and this will complicate the welding equipment and slow down the welding process. Further contact of the work piece by the electrode may contaminate the work piece.

It is therefore an object of the present invention to provide an improved arc starting circuit for use in a welding system.

Another object of the invention is to provide an arc starting system wherein sufficient voltage is applied to the welding electrode to insure firing of the arc at a precise instant.

A further object of the invention is to provide an arc starting circuit for welding systems wherein the time of starting is extremely accurate and the overall equipment is simple and requires no mechanical movements.

A feature of the invention is the provision of an arc starting circuit wherein two voltage pulses are added to provide a pulse of very high voltage which is applied to the welding electrode to initiate the arc thereat.

Another feature of the invention is the provision of an arc starting circuit wherein a first voltage pulse is produced by termination of the current through a choke coil and a second voltage pulse is produced by discharge of a capacitor into a transformer, with the two voltage pulses being added and applied to the welding electrode. A single trigger circuit terminates the flow of current through the choke coil and discharges the capacitor into the transformer by firing a spark gap so that the two voltage pulses are in coincidence and can be added to provide an increased firing voltage.

A further feature of the invention is the provision of a welding system including an arc starting circuit wherein a controlled rectifier provides current through a choke coil which is cut off so that a pulse is developed in the choke coil, and wherein a spark gap is fired by charging and discharging of a first capacitor to provide a path for discharge of a second capacitor into a transformer which steps up the voltage pulse to provide a very sharp pulse which is added to the pulse produced in the choke to fire the arc between the welding electrode and the work piece. A booster circuit is also connected to the welding electrode and includes another spark gap which fires in response to the ignition pulse so that the booster supplies current to the spark gap to feed the welding arc.

Figure 3:
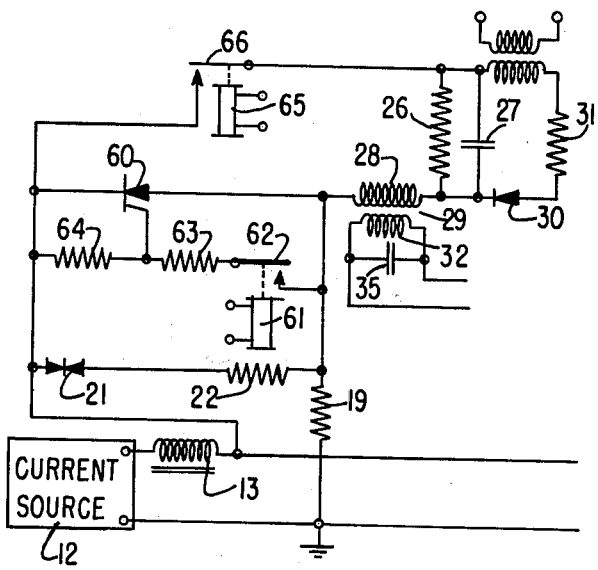
Figure 2:
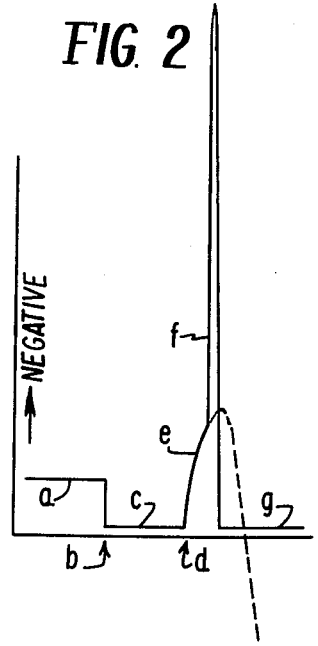

The invention is illustrated in the drawings wherein:
FIG. 1 is a schematic diagram illustrating an arc starting circuit in accordance with the invention;
FIG. 2 is a chart showing the operation of the circuit of FIG. 1; and
FIG. 3 is a partial schematic diagram illustrating a second embodiment of the circuit in accordance with the invention.

In practicing the invention there is provided an arc starting circuit connected to a welding electrode or gun for providing a welding arc at a work piece. The welding electrode is connected to a current source through a choke coil. A rectifier device such as an ignitron tube or a silicon controlled rectifier is connected across the circuit and is rendered conducting to cause current flow through the choke coil. At the time of initiation of the welding arc, conduction of the rectifier is terminated by a trigged circuit which discharges a first capacitor to divert current from the rectifier and extinguishes the same. Discharge of the first capacitor also applies a pulse through a transformer to a second capacitor. The second capacitor is connected to electrodes of a two section spark gap and the capacitor charges slowly from the voltage pulse to fire one section of the spark gap. This causes the second capacitor to discharge rapidly and fire the other section of the spark gap. The second section of spark gap connects a third charged capacitor to the primary winding of a step-up transformer, and when the spark gap fires, this capacitor discharges into the primary winding. The secondary winding of the step-up transformer is connected in series with the choke coil so that the stepped-up pulse is added to the pulse developed across the choke coil when the rectifier is cut off. This produces a very high voltage sharp pulse which is applied to the welding electrode to fire an arc between the electrode and the work piece. In order to make the firing action more effective, a booster circuit is provided which is coupled to the welding electrode through an additional spark gap. This spark gap fires in response to the high voltage pulse applied to the welding electrode to connect a charged condenser thereto through an isolating choke, to supply a supplementary burst of current which further helps to establish the welding arc.

Referring now to the drawings in FIG. 1 there is illustrated the welding circuit of the invention including a welding gun 10 for providing a weld on a work piece 11. A current source 12 is connected through choke coil 13 and the secondary winding 15 of transformer 14 to the gun 10. The transformer 14 includes a ferrite core. An ignitron 18 is connected in series with resistor 19 across the output terminals of the current source, beyond the choke coil 13. A switch 23 provided in a control circuit energizes the igniting electrode to fire the ignitron 18. The ignitron is fired shortly before it is desired to establish an arc between the gun 10 and the work piece 11. When the ignitron 18 fires, the voltage of the current source is reduced as shown by the curve of FIG. 2. Portion $a$ of the curve shows the open circuit voltage, and the ignitron 18 fires at point $b$ to reduce the voltage to the level indicated by $c$.

A trigger circuit is provided, including thyratron tube 25 connected in series with parallel connected resistor 26 and capacitor 27, and the primary winding 28 of transformer 29, across the ignitron 18. When it is desired to fire the arc at the welding gun, 10, a firing pulse is applied to the grid of the thyratron tube 25 which renders the same conducting to complete the series circuit. Capacitor 27 has been charged from the A.C. supply through rectifier 30 and resistor 31. The discharge of capacitor 27 diverts current from the ignitron 18 to cut off the same. When the ignitron is cut off, the reduction in current flow through the choke coil 13 produces a voltage pulse thereacross which is illustrated in FIG.

2. Thyratron 25 fires at point *d* and the voltage pulse produced in choke coil 13 is shown by the portion of the curve marked *e*. A circuit including zener diode 21 and resistor 22 prevents the transient across the choke coil 13 from exceeding a particular value in case the welding arc is not established.

The discharge of capacitor 27 also produces a pulse in the transformer 29. Capacitor 35 is connected to the secondary winding 32 of transformer 29, and charges slowly from this pulse. Connected to capacitor 35 are electrodes 36 and 37 of a spark gap device which includes two spark gaps, one between electrodes 37 and 39 and the second between electrodes 36 and 38. Connected between electrodes 36 and 39 is a series circuit including capacitor 40 and primary winding 41 of the step-up transformer 14. This circuit is formed of heavy wiring and acts as a short circuit to the slow rise in voltage across capacitor 35. As the electrodes 36 and 39 are effectively short circuited, the rise in voltage establishes an arc between electrodes 37 and 39. This causes the capacitor 35 to discharge rapidly, and the rapid discharge of this capacitor establishes an arc between the electrodes 36 and 38.

Capacitor 40 is charged from the A.C. source through rectifiers 42 and 43 and resistor 44. A circuit including resistor 45 and switch 46 is provided for discharge of capacitor 40 if desired. When the spark gap 36 between electrodes 36 and 38 fires, capacitor 40 is discharged into the primary winding 41. Transformer 14 has a ferrite core and the winding 41 has a single turn so that the voltage applied to the secondary winding 15 is stepped-up by a large ratio, such as 100 to 1. This is illustrated in FIG. 2 by the steep spike *f*. This spike occurs during the transient pulse *e* in choke coil 13, so that the spike rides upon the pulse and the spike voltage is added to that of the pulse in choke coil 13 to provide a very large firing voltage which is applied to the electrode or gun 10. This insures instantaneous starting of the arc between the welding electrode and the work piece. After the welding arc is established the voltage drops to the level shown by portion *g* in the curve of FIG. 2.

In order to supplement the firing action, a booster circuit is included. This includes capacitor 50 which is charged through rectifier 51 and resistor 52 by alternating current supplied through transformer 53. The transformer 53 has a pair of primary windings shown connected in parallel to provide the required current. The primary windings may be connected in series if a higher voltage source is applied. The primary windings are connected to the movable tap on winding 54 which is in turn connected to the A.C. source. The movable tap can be adjusted to provide the desired voltage. Resistor 58 and switch 59 are connected to discharge capacitor 50 as may be desired for test purposes.

When the firing pulse is applied to the welding electrode 10, spark gap 55 breaks down to establish a connection from the capacitor 50 through choke 56 to the welding gun, so that the charged capacitor provides current to the welding arc. The choke 56 includes a ferrite core, and prevents the booster circuit from shorting the firing spike voltage.

In FIG. 3 there is illustrated a second embodiment of of the invention. FIG. 3 shows only a portion of the circuit, and the remainder is the same as the circuit of FIG. 1. Elements in FIG. 3 which correspond to the elements in FIG. 1 are given the same reference numbers. In FIG. 3 the thyratron tube 18 is replaced by a silicon controlled rectifier 60. The silicon controlled rectifier 60 is rendered conducting by operation of relay 61 which has contacts 62 and connecting resistors 63 and 64 across the current source. The common point between resistors 63 and 64 is connected to the control electrode of the silicon controlled rectifier 60 to render the same conducting. When rectifier 60 conducts, current flows through choke coil 13 as described in connection with the circuit in FIG. 1.

In FIG. 3 a relay 65 is provided in the trigger circuit in place of the thyratron tube 25 of the system of FIG. 1. The relay 65 has contacts 66 which complete the trigger circuit through capacitor 27 and transformer winding 28 across the rectifier 60. Capacitor 27 discharges through primary winding 28 of the transformer 29 to extinguish the silicon controlled rectifier 60. When the silicon controlled rectifier 60 is extinguished, the current in choke coil 13 is suddenly reduced to produce a voltage pulse, as previously described. Capacitor 27 also applies a pulse to the transformer 29, which is applied from secondary winding 32 thereof to capacitor 35 to slowly charge the same in the manner previously described in connection with FIG. 1 to fire the first section of the spark gap. The succeeding operation is exactly the same as has been described, and will not be repeated.

The arc starting system described has been found to be highly successful in accurately controlling the time of firing of a welding arc. A sufficiently high voltage is applied to the welding electrode that firing of the arc is assured under various conditions encountered in different applications. The circuit uses standard components which are available and is not critical of adjustment. As illustrated in the circuit of FIGS. 1 and 3 different components can be substituted to provide the same advantageous operation.

I claim:

1. A starting system for initiating an arc at a welding electrode including in combination, a circuit including a choke oil for connecting the welding electrode to current supply means, an electron control device connected to said circuit and operative to cause current flow through said choke coil, a trigger circuit connected to said control device and operative to terminate conduction in said device to thereby produce a first voltage pulse in said choke coil, a step-up transformer having primary and secondary windings with said secondary winding connected in circuit with said choke coil and the welding electrode, capacitor means connected to said primary winding and to said trigger circuit, and means for charging said capacitor means, said trigger circuit including means operating to discharge said capacitor means into said primary winding to produce a second voltage pulse in said secondary winding, said first and second voltage pulses being added and applied to the welding electrode to fire the welding arc.

2. A starting system for initiating an arc at a welding electrode including in combination, a circuit including a choke coil for connecting the welding electrode to current supply means, a controlled rectifier connected to said circuit, means rendering said rectifier operative to cause current flow through said choke coil, a trigger circuit connected to said control device and operative to terminate conduction in said device to thereby produce a first voltage pulse in said choke coil, a step-up transformer having primary and secondary windings with said secondary winding connected in circuit with said choke coil and the welding electrode, said trigger circuit including spark gap means, capacitor means connected through said spark gap means to said primary winding, means for charging said capacitor means, said trigger circuit operating to fire said spark gap means to discharge said capacitor means into said primary winding to produce a second voltage pulse in said secondary winding, said first and second voltage pulses being added and applied to said welding electrode to fire the welding arc.

3. A starting system for initiating an arc at a welding electrode including in combination, a circuit including a choke coil for connecting the welding electrode to current supply means, an electron control device connected to said circuit and operative to cause current flow through said choke coil, a trigger circuit connected to said control device and operative to terminate conduction in said device to thereby produce a first voltage pulse in said choke coil, transformer means having primary and secondary windings with said secondary winding connected in circuit with said choke coil and the welding electrode, capacitor means connected to said primary winding and to said trigger circuit, means for charging said capacitor means, said trigger circuit including means operating to discharge said capacitor means into said primary winding to produce a second voltage pulse in said secondary winding, said second voltage pulse being added to said first voltage pulse to provide a firing pulse applied to the welding electrode to fire the welding arc, and means connected to the welding electrode and responsive to said firing pulse to apply current through the welding electrode to the welding arc.

4. A starting system for initiating an arc at a welding electrode including in combination, a first step-up transformer including primary and secondary windings, a circuit for connecting the welding electrode to a source of current including said secondary winding and a choke coil, an electron control device connected to said circuit and operative to cause current flow through said choke coil, a trigger circuit including a second transformer connected to said control device and operative to terminate conduction in said device and to produce a pulse in said second transformer, a capacitor connected to said second transformer and adapted to be charged by said pulse, spark gap means having first and second sections with electrodes connected to said capacitor, said first section of said spark gap means firing in response to charging of said capacitor to rapidly discharge said capacitor, said second section of said spark gap means firing in response to rapid discharge of said capacitor, a second capacitor and means for charging the same, said second capacitor being connected in series with said primary winding of said step-up transformer and said second section of said spark gap means and discharging into said primary winding when said second section fires, said choke coil producing a first voltage pulse when conduction is terminated in said control device, and discharge of said capacitor means into said primary winding producing a second voltage pulse in said secondary winding which is added to said first voltage pulse and applied to the welding electrode to fire the welding arc.

5. A starting system for initiating an arc at a welding electrode including in combination, a circuit for connecting the welding electrode to a source of current including a choke coil, an electron control device connected to said circuit and operative to cause current flow through said choke coil, a trigger circuit including switch means, first capacitor means and transformer means connected in series to said control device, said trigger circuit being activated by operation of said switch means to discharge said capacitor means and terminate conduction in said device and produce a pulse in said transformer, second capacitor means connected to said transformer and adapted to be charged by said pulse, spark gap means having first and second sections with electrodes connected to said second capacitor means, said first section of said spark gap means firing in response to charging of said second capacitor means to thereby rapidly discharge the same, said second section of said spark gap means firing in response to rapid discharge of said second capacitor means, third capacitor means and means for charging the same, a step-up transformer including primary and secondary windings, said third capacitor means being connected in series with said primary winding of said step-up transformer and said second section of said spark gap means and discharging into said primary winding when said second section fires, said choke coil producing a first voltage pulse when conduction is terminated in said control device, discharge of said third capacitor means into said primary winding producing a second voltage pulse in said secondary winding, said secondary winding being connected in series with said choke coil and the welding electrode so that said first and second voltage pulses are added and applied to the welding electrode to fire the welding arc.

6. A starting system for initiating an arc at a welding electrode including in combination, a circuit for connecting the welding electrode to a source of current including a choke coil, an electron control device connected to said circuit and operative to cause current flow through said choke coil, a trigger circuit including a transformer connected to said control device and operative to terminate conduction in said device and to produce a pulse in said transformer, first capacitor means connected to said transformer and adapted to be charged by said pulse, spark gap means having first and second sections with electrodes connected to said first capacitor means, a step-up transformer including primary and secondary windings, second capacitor means and means for charging the same, said second capacitor means being connected in series with said primary winding of said step-up transformer and said second section of said spark gap means, said first section of said spark gap means firing in response to charging of said first capacitor means to thereby rapidly discharge said first capacitor means, said second section of said spark gap means firing in response to rapid discharge of said first capacitor means to discharge said second capacitor means into said primary winding of said transformer, said choke coil producing a first voltage pulse when conduction is terminated in said control device, discharge of said second capacitor means into said primary winding producing a second voltage pulse in said secondary winding, said secondary winding being connected in series with said choke coil and the welding electrode so that said second voltage pulse is added to said first voltage pulse and applied to the welding electrode to fire the welding arc.

7. A starting system for initiating an arc at a welding electrode including in combination, a circuit for connecting the welding electrode to a source of current including a choke coil, an electron control device connected to said circuit and operative to cause current flow through said choke coil, a trigger circuit including switch means, first capacitor means and transformer means connected in series to said control device, said switch means being operative to complete said trigger circuit to discharge said capacitor means and thereby terminate conduction in said device and produce a pulse in said transformer, said choke coil producing a first voltage pulse when conduction is terminated in said control device, second capacitor means connected to said transformer and adapted to be slowly charged by said pulse, spark gap means having first and second sections with electrodes connected to said second capacitor means, a step-up transformer including primary and secondary windings, third capacitor means and means for charging the same, said third capacitor means being connected in series with said primary winding of said step-up transformer and said second section of said spark gap means, said first section of said spark gap means firing in response to slow charging of said second capacitor means to thereby rapidly discharge said second capacitor means, said second section of said spark gap means firing in response to rapid discharge of said second capacitor means to discharge said third capacitor means into said primary winding of said transformer to produce a second voltage pulse in said secondary winding, said secondary winding being connected in series with said choke coil and the welding electrode so that said first and second voltage pulses are added and applied to the welding electrode to fire the welding arc.

8. A starting system for initiating an arc at a welding electrode including in combination, a step-up transformer including primary and secondary windings, a circuit for connecting the welding electrode to a source of current including said secondary winding and a choke coil, an electron control device connected to said circuit and operative to cause current flow through said choke coil, a trigger circuit including a transformer connected to said control device and operative to terminate conduction in said device and to produce a pulse in said transformer, said choke coil producing a first voltage pulse when conduction is terminated in said control device, first capacitor means connected to said transformer and adapted to be charged by said pulse, spark gap means having first and second sections with electrodes connected to said first capacitor means, second capacitor means and means for charging the same, said second capacitor means being connected in series with said primary winding of said step-up transformer and said second section of said spark gap means, said first section of said spark gap means firing in response to charging of said first capacitor to thereby rapidly discharge said first capacitor means, said second section of said spark gap means firing in response to rapid discharge of said first capacitor means to discharge said second capacitor means into said primary winding of said transformer and produce a second voltage pulse in said secondary winding, said first and second voltage pulses adding at the welding electrode to fire the welding arc, and booster means for providing additional welding current including further spark gap means connected to the welding electrode, said spark gap means firing in response to said pulses at the welding electrode to apply welding current thereto.

9. A starting system for initiating an arc at a welding electrode including in combination, a circuit for connecting the welding electrode to a source of current including a secondary winding and a choke coil, an ignitron connected to said circuit and operative to cause current flow through said choke coil, a trigger circuit including a thyratron tube, first capacitor means and transformer means connected in series to said control device, means rendering said thyratron tube operative to discharge said capacitor means and terminate conduction in said ignitron and produce a pulse in said transformer, said choke coil producing a first voltage pulse when conduction is terminated in said control device, second capacitor means connected to said transformer and adapted to be slowly charged by said pulse, spark gap means having first and second sections with electrodes connected to said second capacitor means, a step-up transformer including primary and secondary windings, third capacitor means and means for charging the same, said third capacitor means being connected in series with said primary winding of said step-up transformer and said second section of said spark gap means, said first section of said spark gap means firing in response to slow charging of said second capacitor means to thereby rapidly discharge said second capacitor means, said second section of said spark gap means firing in response to rapid discharge of said second capacitor means to discharge said third capacitor means into said primary winding of said transformer to produce a second voltage pulse in said secondary winding, said secondary winding being connected in series with said choke coil and the welding electrode so that said first and second voltage pulses are added and applied to the welding electrode to fire the welding arc.

10. A starting system for initiating an arc at a welding electrode including in combination, a circuit for connecting the welding electrode to a source of current including said secondary winding and a choke coil, a silicon controlled rectifier connected to said circuit and operative to cause current flow through said choke coil, a trigger circuit including relay means having contacts connected in series with first capacitor means and transformer means across said silicon controlled rectifier, said relay means being operative to discharge said capacitor means and thereby terminate conduction in said device and produce a pulse in said transformer, said choke coil producing a first voltage pulse when conduction is terminated in said control device, second capacitor means connected to said transformer and adapted to be slowly charged by said pulse, spark gap means having first and second sections with electrodes connected to said second capacitor means, a step-up transformer including primary and secondary windings, third capacitor means and means for charging the same, said third capacitor means being connected in series with said primary winding of said step-up transformer and said second section of said spark gap means, said first section of said spark gap means firing in response to slow charging of said second capacitor means to thereby rapidly discharge said second capacitor means, said second section of said spark gap means firing in response to rapid discharge of said second capacitor means to discharge said third capacitor means into said primary winding of said transformer to produce a second voltage pulse in said secondary winding, said secondary winding being connected in series with said choke coil and the welding electrode so that said first and second voltage pulses are added and applied to the welding electrode to fire the welding arc.

No references cited.